M. P. SHORB
2,961,496
AMPLIFIER FOR RECORDING AND PLAYBACK
IN A DICTATING MACHINE AND THE LIKE
Filed Feb. 7, 1957
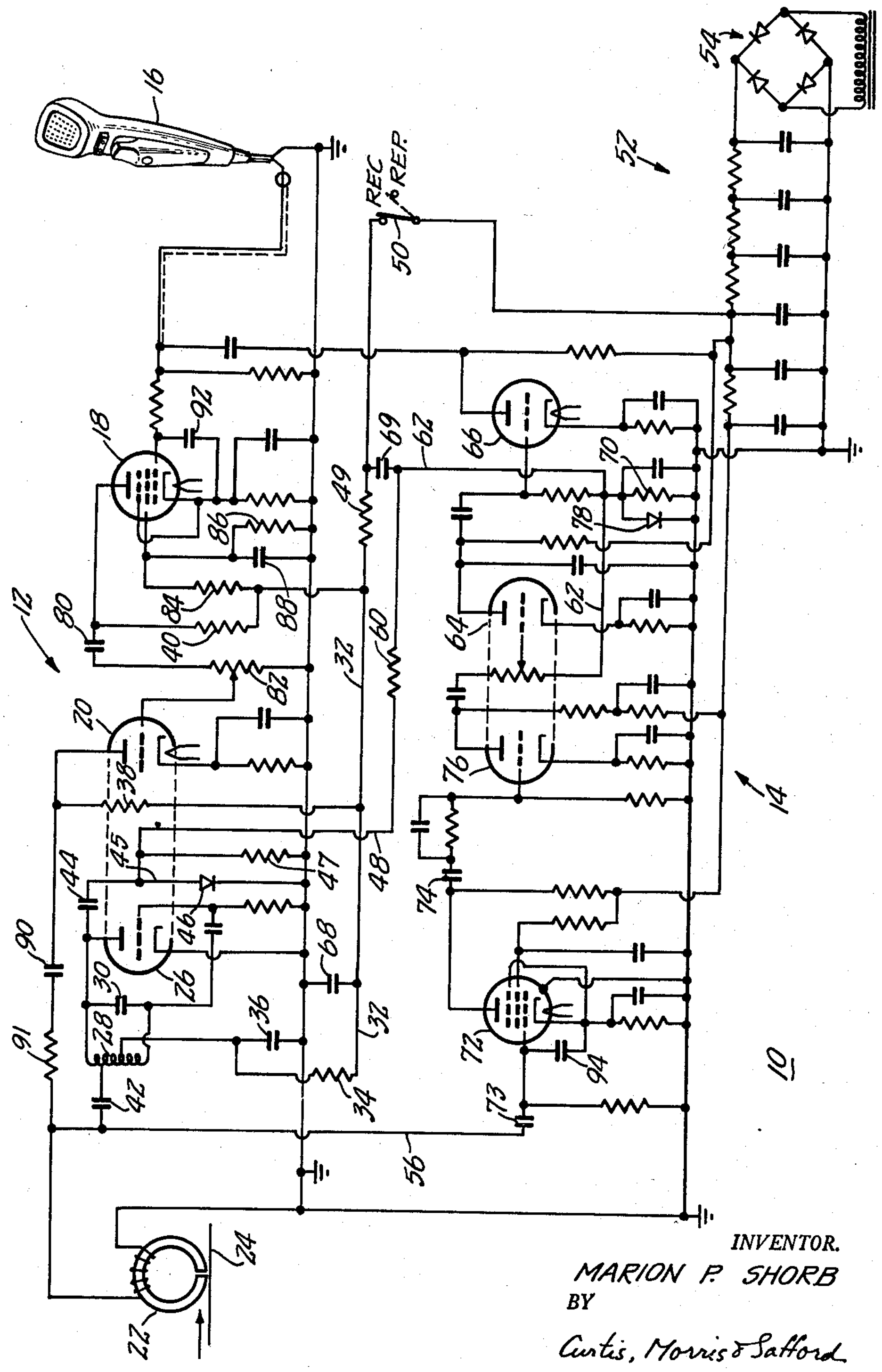
INVENTOR.
MARION P. SHORB
BY
Curtis, Morris & Safford
ATTORNEYS

United States Patent Office 2,961,496

Patented Nov. 22, 1960

2,961,496

AMPLIFIER FOR RECORDING AND PLAYBACK IN A DICTATING MACHINE AND THE LIKE

Marion P. Shorb, Fairfield, Conn., assignor to Dictaphone Corporation, Bridgeport, Conn., a corporation of New York Filed Feb. 7, 1957, Ser. No. 638,723

10 Claims. (Cl. 179—100.2)

This invention relates to an amplifier for a dictating machine or the like.

An object of this invention is to provide such an amplifier having improved means for switching from recording to playback condition and vice-versa.

Another object is to provide such an amplifier which is reliable and which gives good performance in either of its conditions of operation.

A further object is to provide such an amplifier which is inexpensive and which is particularly adapted for use in a dictating machine wherein the amplifier must be frequently and quickly changed from recording to playback condition and vice-versa.

A still further object is to provide such an amplifier which is particularly adapted for use in a dictating machine using magnetic records.

These and other objects will in part be understood from and in part pointed out in the description given hereinafter.

Two separate amplifiers frequently are employed in dictating machines, one amplifier for recording and one for reproducing, i.e. "playback." During recording, for example, voice waves are picked up by a microphone, fed to a recording amplifier and then applied to the recording head of the machine. During playback, the record is moved past the head and the signals picked up thereby are applied to a reproducing or playback amplifier, and thence to a loudspeaker. In some machines, the microphone is arranged to serve also as the loudspeaker during playback.

In the past, switchover from one amplifier to the other to condition the machine for recording or for playback typically required the actuation of a relatively large number of switches, some of which were required to handle audio-circuits easily susceptible to stray feedback or hum or switching noises or faulty contacts. To make such a dual amplifier system workable required careful engineering and the use of well made, relatively expensive switches which were generally complex and bulky, and furthermore in some applications the operation was not fully satisfactory. It is therefore an important object of this invention to provide an amplifier arrangement which can be switched from recording to reproducing and vice-versa with a minimum number of switches and with minimum audio disturbance.

In accordance with the present invention, there is provided an amplifier for use in conjunction with a machine for recording on magnetic records and which is adapted for changeover from recording to reproducing and vice-versa by the actuation of a single switch. This arrangement includes two amplifiers, with the input of the recording amplifier and the output of the playback amplifier connected together to a single combined microphone-loudspeaker, and the output of the recording amplifier and the input of the playback amplifier connected together to a single magnetic recording and reproducing head of the dictating machine. During recording, the recording amplifier applies audio signals to the recording head along with high-frequency bias signals in the manner well known to the art. During this operation the playback amplifier, though connected, is disabled by means of signals derived from the recording amplifier. There is thus no possibility, when the recording amplifier is on, for the playback amplifier to function.

Changeover from recording to playback is accomplished by the actuation of a single switch which disables the recording amplifier. This cuts off the disabling signals applied by the recording amplifier to the playback amplifier thereby conditioning the latter for reproducing any audio signals picked up by the recording-reproducing head. The circuit is arranged so that there is negligible interference between the two amplifiers even though their respective inputs and outputs are connected together. Moreover the circuit is arranged so that effectively no residual magnetization remains in the recording/reproducing head when the amplifiers are switched from one condition of operation to the other.

A better understanding of the invention together with a fuller appreciation of its many advantages will best be gained from a study of the following description given in connection with the single figure of accompanying drawing which shows a combined recording-reproducing amplifier embodying features of the invention and particularly adapted for use in a dictating machine employing magnetic records.

Referring to the drawing, the circuit 10 illustrated includes a recording amplifier generally indicated at 12 and a playback amplifier generally indicated at 14. The input circuit of amplifier 12 and the output circuit of amplifier 14 are connected to the combined hand-microphone and loudspeaker 16. During recording, electric signals from microphone 16 are applied to the control grid of pentode tube 18, amplified and then fed to the power output tube 20. From the latter the signals are led to the magnetic recording head 22. A magnetic record 24 is adapted to be driven past head 22 by the dictating machine (not shown) to have impressed thereon a signal track in the manner well known to the art.

Simultaneously with applying intelligence signals to head 22, amplifier 12 also supplies the head with high-frequency bias signals. These bias signals are generated by the oscillator tube 26 which functions as a conventional Hartley oscillator. The plate of tube 26 is energized through the tank coil 28, in parallel with the tank capacitor 30, from the positive voltage bus 32. A decoupling resistor 34 and capacitor 36 are connected between coil 28 and bus 32 as shown.

During recording, the plates of tubes 18, 20 and 26 are energized with suitable positive voltage from bus 32, the plate of tube 26 as described previously and the plates of tubes 20 and 18 via resistors 38 and 40 respectively. High-frequency bias current is applied to head 22 from tube 26 via capacitor 42 connected to tank coil 28. High-frequency current is also applied from the plate of tube 26 via capacitor 44 and lead 45 to the rectifier 46 the other side of which is grounded; a resistor 47 is connected in parallel with this rectifier. Rectifier 46 is poled so that at lead 45 there is developed a negative voltage with respect to ground. This negative voltage is used to disable playback amplifier 14 during recording and is applied to this amplifier via the lead 48.

Positive D.-C. voltage is supplied to bus 32 at its right-hand end through the resistor 49 and the switch 50 from the power supply generally indicated at 52 and including the bridge-connected rectifiers 54. Switch 50 may for example be a "point of farthest advance" switch operated by the dictating machine carriage in such a manner that the switch is closed when record head 22 is moving past portions of record 24 not recorded upon and open when the head is moving over a previously recorded-upon portion.

When playback of a portion of record 24 is desired, switch 50 is opened and, as the record moves past the head 22, magnetic flux from the record produces an electric output signal in the well known way. This signal is applied to playback amplifier 14 via lead 56. However, to place this amplifier in operating condition so that the input signal to it may be utilized to drive microphone-loudspeaker 16, the negative bias voltage supplied from lead 48 must be extinguished or caused to fall to zero.

As previously mentioned, amplifier 14 is disabled by the negative voltage applied to lead 48. This lead is in turn connected via the resistor 60 to the lead 62 and thence to the grids of the tubes 64 and 66 in amplifier 14. The negative voltage which reaches these tubes from lead 48 during recording is sufficient to hold them below cutoff and thus inoperative.

The instant switch 50 is opened, thereby disconnecting voltage supply bus 32 from supply 52, the voltage on this bus begins to fall to zero. However, to prevent the sudden die-out of oscillator 26 with the accompanying possibility of leaving head 22 magnetized or of causing it to become magnetized, the voltage on bus 32 is prevented from suddenly dropping to zero by the storage capacitor 68 connected between the bus and ground. Thus when switch 50 is opened, the oscillations of tube 26 gradually die out over a short period of time and amplifier 14 remains disabled during this period.

To prevent any audible "pop" which might otherwise be heard from loudspeaker 16 upon switchover to playback, playback amplifier 14 is maintained in disabled condition for a short time after recording amplifier 12 ceases to function. This is accomplished by the discharge of the capacitor 69, connected between resistor 49 and lead 62, through the resistor 70, connected between lead 62 and ground. The discharge of this capacitor, upon the opening of switch 50, develops a voltage across resistor 70 that is negative with respect to ground and this holds the grids of tubes 64 and 66 below cutoff for an additional time interval.

Further assisting in blocking operation of amplifier 14 after switch 50 is closed is the fact that lead 56 to the amplifier input supplies, during recording, a relatively high level bias signal. This bias signal drives the grid of the pentode input tube 72 positive and causes the grid coupling capacitor 73 to become charged with its positive side connected to lead 56. Similarly, the coupling capacitor 74 from tube 72 to the next tube 76 becomes charged by grid conduction. When the bias on lead 56 decreases to a much lower value on the opening of switch 50, the capacitors 73 and 74 momentarily hold the grids of their respective tubes negative. Grid conduction of tubes 72 and 76 during recording also causes a reduction in their gain and assures that amplifier 14 is disabled.

A short time after the opening of switch 50 and after recording amplifier 12 has effectivley ceased to function, playback amplifier 14 is permitted to operate as explained previously. Input signals from head 22 applied to tube 72 are amplified and then applied to microphone-loudspeaker 16 where they are reproduced as sound.

To return circuit 10 to recording condition, switch 50 is closed and voltage applied to bus 32. At this instant there is a positive current surge through capacitor 69 to ground but this current is bypassed around resistor 70 by the diode 78 shunted across it and poled for positive current flow to ground. Thus the grids of tubes 64 and 66 are effectively prevented from being driven positive by this current surge.

Since the storage capacitor 68 connected to bus 32 is relatively large, the voltage on the bus builds up slowly; this helps prevent magnetization of head 22 by switching transients. To further assure the elimination of such transients, the coupling capacitor 80 between the plate of tube 18 and the grid resistor 82 of tube 20 is made somewhat larger than ordinarily required. When switch 50 is closed, the grid of tube 20 is driven positive so as to draw grid current and thereby block the tube for a short time and minimize transient effects. Also, the screen of tube 18 is fed from bus 32 by a voltage-divider consisting of the resistors 84 and 86; the capacitor 88, connected between this screen electrode and ground, is made as small as possible consistent with satisfactory low frequency response of amplifier 12.

The plate of output tube 20 in recording amplifier 12 is coupled to head 22 through the capacitor 90 and a resistor 91. When switch 50 is closed, a small charge of current will pass through the head winding to this capacitor, but this charge will in general not be sufficient to magnetize the head. To assure that there is no magnetization from this current, a capacitor and a resistor in series (not shown) can be connected between lead 56 and bus 32. When the switch is closed, a charge will flow through the winding of head 22 in opposite direction to the charge caused by capacitor 90. By selecting the size of the additional capacitor and resistor, these charges can be made to cancel.

The input tubes 18 and 72 of amplifiers 12 and 14 are advantageously pentodes because this type has less grid-to-plate capacitance than a triode. Thus unwanted feed-through of signal from grid-to-plate is minimized. The grids of tubes 18 and 72 are shunted to the corresponding cathodes by the small capacitors 92 and 94, respectively, to minimize radio frequency pickup.

In a model of circuit 10 which has been built and tested the following values and types for certain of its elements were as follows: tubes 18 and 72, type 5879; tubes 20, 26 and 64, 76 type 12AX7; tube 66, 6C4; resistor 34, 62,000 ohms; capacitor 36, 0.047 microfarads; resistor 38, 100,000 ohms; resistor 40, 470,000 ohms; capacitor 44, 0.0047 microfarads; resistor 47, 470,000 ohms; resistor 49, 10,000 ohms; resistor 60, 1 million ohms; capacitor 68, 1 microfarad; capacitor 69, 0.047 microfarads; resistor 70, 2.2 million ohms; capacitor 80, 0.022 microfarad; resistor 82, 1 million ohms; resistor 84, 150,000 ohms; resistor 86, 22,000 ohms; capacitor 88, 0.1 microfarad; capacitor 90, 0.047 microfarad; capacitors 92, 94, 100 microfarads each.

The other elements of circuit 10 which have not been specifically described have values and function in a way well known to those skilled in the art.

The above description of the invention is intended in illustration and not in limitation thereof. Various minor changes in the embodiment illustrated may occur to those skilled in the art and these may be made without departing fom the spirit or scope of the invention as set forth. Thus, for example, the output signal from playback amplifier 14 can be applied to a separate loudspeaker instead of the combined loudspeaker-microphone 16 illustrated.

I claim:

1. An amplifier for use in a recording-reproducing machine requiring changeover from one condition of operation to the other, said amplifier comprising a recording section, a reproducing section, supply means to energize said reproducing section, supply means to energize said recording section, switch means to selectively disable said recording section, a magnetic transducing head, the output of said recording section and the input of said reproducing section being connected to said transducing head, a bias current oscillator included in said recording section, and rectifier bias-voltage means connected to said reproducing section and energized by said oscillator to disable said reproducing section during recording and to permit said reproducing section to operate when said recording section is disabled by said switch means.

2. The combination of elements as in claim 1 wherein said switch means comprises a single pole, single throw switch adapted to connect or disconnect said recording means from said supply means, and in further combination with time delay means for continuing the disabling of said reproducing section for a short time after said switch is opened.

3. An amplifier circuit particularly suited for use in a dictating machine employing magnetic records, said circuit including voltage supply means, a recording amplifier including a high-frequency oscillator for applying bias currents to a record during recording, a switch connecting said recording amplifier to said voltage means, a playback amplifier connected to said voltage means, and bias means energized by said oscillator and connected to said playback amplifier for disabling said playback amplifier during operation of said recording amplifier whereby changeover from recording to playback and vice versa can be controlled solely by the actuation of said switch.

4. The combination of elements as in claim 3 wherein the output of said recording amplifier and the input of said playback amplifier are connected together to a single magnetic recording head, and wherein said bias means includes a rectifier and a filter for applying a negative voltage to said playback amplifier, and in further combination with capacitor means to prevent the sudden die out of oscillations from said oscillator when said switch is opened and said recording amplifier is disconnected from said voltage means.

5. The combination of elements as in claim 4 in further combination with negative pulse means for applying to said playback amplifier a short duration negative voltage sufficient to disable said amplifier for a short time after said oscillations have ceased.

6. The combination of elements as in claim 5 wherein the output of said playback amplifier and the input of said recording amplifier are connected together to a single sound transducer, and wherein the input stage of said recording amplifier and the input stage of said playback amplifier each includes a pentode tube having low feed-through capacitance.

7. A circuit of the character described comprising voltage supply means, a switch, a resistor and a voltage bus connected in this order to said voltage means; a recording amplifier having a pentode input tube, an output and an oscillator tube, the plates of said tubes being energized from said bus, the screen of said pentode being energized therefrom by a voltage divider and having a small capacitor connected between itself and ground; a storage capacitor connected between said bus and ground; a magnetic recording head, the plates of said recording output and oscillator tubes being coupled to said head; a playback amplifier having a pentode input tube, at least one intermediate tube and an output tube, said tubes being energized from said voltage means but not through said switch, the input of said playback pentode tube being coupled to said head; and means to disable said playback amplifier during recording, said means being controlled by said oscillator.

8. The combination of elements as in claim 7 wherein said means to disable includes a rectifier coupled to said oscillator, filter means connected to said rectifier to obtain therefrom a negative voltage, and connector means to apply this negative voltage to the grid of at least one tube in said playback amplifier, said negative voltage being sufficient to bias said tube to cutoff.

9. The combination of elements as in claim 8 in which said connector means includes a lead having a shunt resistor connected between itself and ground, and a resistor connected between itself and the grid of said one playback tube and in further combination with a capacitor connected between said lead and the passive side of said switch whereby said capacitor will cause a negative voltage for a short time across said shunt resistor when said switch is opened.

10. The combination of elements as in claim 9 wherein the screen of said recording input pentode is energized from said bus by a voltage divider and is shunted to ground by a filter capacitor having the smallest value possible for a given low frequency response of said recording amplifier and in further combination with a rectifier poled for positive current flow to ground and shunted across said shunt resistor.

References Cited in the file of this patent

UNITED STATES PATENTS

| | | |
|---|---|---|
| 2,546,338 | Glasford et al. | Mar. 27, 1951 |
| 2,567,582 | Spears | Sept. 11, 1951 |
| 2,694,108 | Taylor | Nov. 9, 1954 |

FOREIGN PATENTS

| | | |
|---|---|---|
| 162,005 | Australia | Mar. 17, 1955 |